Patented Sept. 26, 1922.

1,430,052

UNITED STATES PATENT OFFICE.

VAUGHN W. BROOKS, OF JOLIET, ILLINOIS.

SHARPENING MATERIAL.

No Drawing.  Application filed June 17, 1921. Serial No. 478,283.

*To all whom it may concern:*

Be it known that I, VAUGHN W. BROOKS, a citizen of the United States, and a resident of Joliet, in the county of Will and State of Illinois, have invented certain new and useful Improvements in Sharpening Materials, of which the following is a full, clear, and exact description.

The invention relates to sharpening materials. The object of the invention is to provide an improved sharpening material which is adapted to be used on a strop to put sharp and smooth edges on razors or other cutting blades.

The invention consists in the novel combinations of elements hereinafter set forth and more particularly defined by claims at the conclusion hereof.

The improved material consists of the following:

| | |
|---|---:|
| Rock or quartziferous silica about | 97.5% |
| Iron about | 8% |
| Alumina about | 2% |
| Talc about | 1.5% |

All of these constituents are ground to about 200 mesh and mixed together.

This material is distributed over the strop which has had a lather applied thereto to cause the powdered material to adhere to the strop. In practice, it has been found that the powder will pass into the pores of the strop and provide a smooth sharpening surface thereon, which is effective in putting a smooth sharp edge on a razor or other cutting blade. The talc smoothens the hard particles of silica, iron and alumina to a degree.

In practice, it has been found that this sharpening material applied to a strop will, when a razor or other cutting blade is drawn over the strop, put a sharp, smooth edge on the blade. While the talc has been found to function as pointed out, the remaining constituents of the material will, in some instances, produce the desired result without the talc. The percentages stated are approximate and the invention is not to be understood as limited to those set forth. Rock or quartziferous silica is used and in some instances, silica rock is used which contains several of the constituents of the material. The grinding of the constituents to the fineness set forth has been found to be necessary in attaining the desired result.

The term quartziferous silica is to be understood as silica derived from quartz.

Having thus described the invention, what I claim as new and desire to secure by Letters Patent, is:

1. Sharpening material adapted for application to a strop consisting of ground natural quartziferous silica and natural iron and alumina in approximately the percentages specified.

2. Sharpening material adapted for application to a strop consisting of ground natural quartziferous silica, natural iron alumina and talc approximately in the percentages specified.

3. A sharpening dressing for strops consisting of natural quartzite and talc finely ground, the quartzite being composed of more than 90% of silica and only small traces of iron and alumina.

VAUGHN W. BROOKS.